United States Patent
Nihei et al.

(10) Patent No.: US 8,270,026 B2
(45) Date of Patent: Sep. 18, 2012

(54) LIGHT SOURCE DRIVING DEVICE WITH RELATIONSHIP-BASED DRIVE SIGNAL GENERATING CIRCUIT, OPTICAL SCANNING DEVICE, AND IMAGE FORMING APPARATUS

(75) Inventors: Yasuhiro Nihei, Kanagawa (JP); Masaaki Ishida, Kanagawa (JP); Atsufumi Omori, Kanagawa (JP); Dan Ozasa, Kanagawa (JP); Jun Tanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 876 days.

(21) Appl. No.: 12/348,618

(22) Filed: Jan. 5, 2009

(65) Prior Publication Data

US 2009/0174915 A1 Jul. 9, 2009

(30) Foreign Application Priority Data

Jan. 7, 2008 (JP) ................. 2008-000238

(51) Int. Cl.
*G06K 15/12* (2006.01)
*H04N 1/04* (2006.01)
(52) U.S. Cl. .................. 358/1.7; 358/474
(58) Field of Classification Search ............... 358/1.1, 358/1.7, 1.9, 1.13, 1.14, 1.15, 1.18, 443, 358/475, 486, 474, 471, 509
See application file for complete search history.

(56) References Cited

U.S. PATENT DOCUMENTS

| | | | |
|---|---|---|---|
| 5,402,155 A * | 3/1995 | Hatayama et al. | 347/247 |
| 6,791,596 B2 | 9/2004 | Nihei et al. | |
| 6,927,789 B2 | 8/2005 | Ozasa et al. | |
| 6,933,957 B2 | 8/2005 | Omori et al. | |
| 7,116,347 B2 * | 10/2006 | Kawamura | 347/249 |
| 7,212,224 B2 | 5/2007 | Nihei et al. | |
| 7,256,815 B2 | 8/2007 | Suzuki et al. | |
| 7,271,824 B2 | 9/2007 | Omori et al. | |
| 7,283,151 B2 | 10/2007 | Nihei et al. | |
| 7,327,379 B2 | 2/2008 | Nihei et al. | |
| 2004/0246329 A1 * | 12/2004 | Yoshida | 347/237 |
| 2005/0089069 A1 | 4/2005 | Ozasa et al. | |
| 2005/0219354 A1 | 10/2005 | Omori et al. | |
| 2005/0243163 A1 | 11/2005 | Ozasa et al. | |
| 2006/0209170 A1 | 9/2006 | Nihei | |
| 2006/0285186 A1 | 12/2006 | Ishida et al. | |
| 2007/0030548 A1 | 2/2007 | Nihei et al. | |
| 2007/0091163 A1 | 4/2007 | Omori et al. | |
| 2007/0126517 A1 | 6/2007 | Ozasa | |
| 2007/0132828 A1 | 6/2007 | Ishida et al. | |

(Continued)

FOREIGN PATENT DOCUMENTS

| | | |
|---|---|---|
| JP | 2003-276234 | 9/2003 |
| JP | 2005-186561 | 7/2005 |

*Primary Examiner* — Gabriel Garcia
(74) *Attorney, Agent, or Firm* — Dickstein Shapiro LLP

(57) ABSTRACT

A write control circuit includes a first data switching circuit that sets a correspondence relationship between signals from line buffers and input signals to a delay circuitry, based on a signal from a CPU; and a second data switching circuit that sets a correspondence relationship between output signals of the delay circuitry and drive signals, based on a signal from the CPU. This enables a plurality of light emitting sections to be driven properly, regardless of a main scanning direction and an arrangement of a plurality of light spots being in any of CASE-1 to CASE-4 in an optical scanning device.

9 Claims, 22 Drawing Sheets

U.S. PATENT DOCUMENTS

| | | |
|---|---|---|
| 2007/0206234 A1 | 9/2007 | Ozasa et al. |
| 2008/0088893 A1 | 4/2008 | Ishida et al. |
| 2008/0123160 A1 | 5/2008 | Omori et al. |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0284838 A1 | 11/2008 | Suzuki et al. |
| 2008/0291259 A1 | 11/2008 | Nihei et al. |

* cited by examiner

FROM 219C

| | DELAY CIRCUIT | | | |
|---|---|---|---|---|
| | 219b₁ | 219b₂ | 219b₃ | 219b₄ |
| DELAY TIME | 11T | 8T | 5T | 2T |

T: CYCLE OF PIXEL CLOCK SIGNAL

FIG. 9

|  | MAIN SCANNING DIRECTION | ARRANGEMENT OF LIGHT SPOTS |
|---|---|---|
| CASE-1 | -Y DIRECTION | SAME AS ARRANGEMENT OF LIGHT EMITTING SECTIONS (ARRANGEMENT A) |
| CASE-2 | -Y DIRECTION | UPSIDE DOWN OF ARRANGEMENT OF LIGHT EMITTING SECTIONS (ARRANGEMENT B) |
| CASE-3 | +Y DIRECTION | SAME AS ARRANGEMENT OF LIGHT EMITTING SECTIONS (ARRANGEMENT A) |
| CASE-4 | +Y DIRECTION | UPSIDE DOWN OF ARRANGEMENT OF LIGHT EMITTING SECTIONS (ARRANGEMENT B) |

FIG. 10

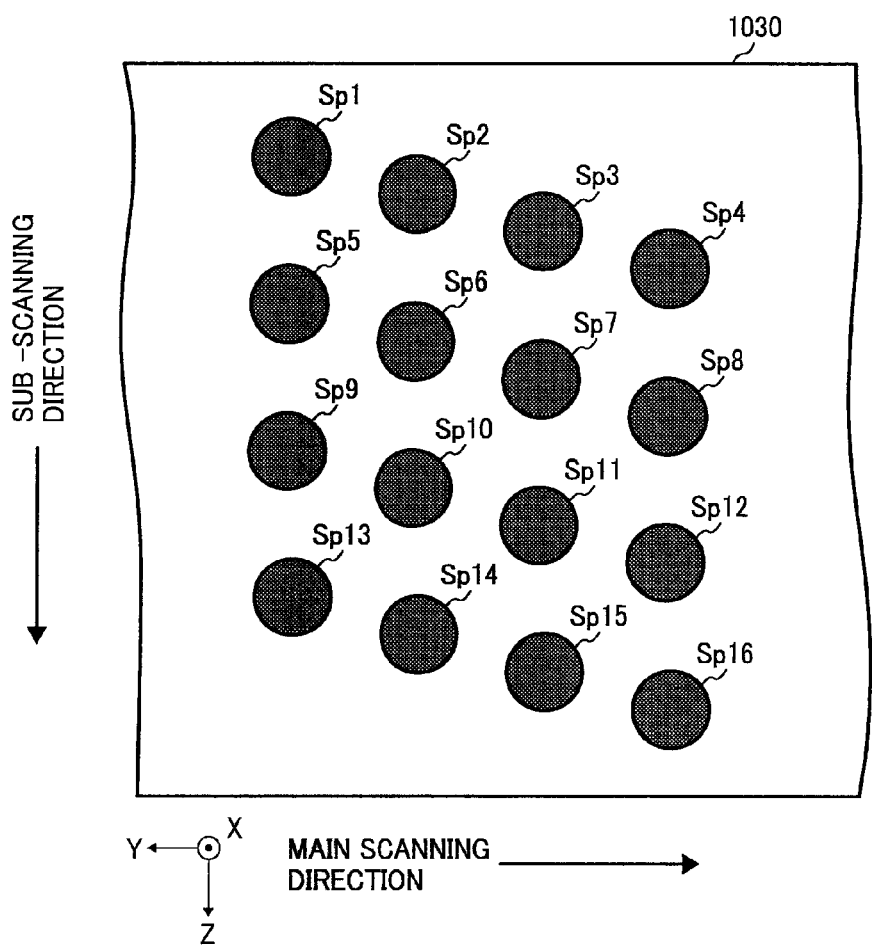

|  | CASE-1 | CASE-2 | CASE-3 | CASE-4 |
|---|---|---|---|---|
| Ssw1 | L | H | H | L |
| Ssw2 | L | L | H | H |

| | CASE-1 CASE-4 | CASE-2 CASE-3 |
|---|---|---|
| | Ssw1=L | Ssw1=H |
| In1 | $S218_1$ | $S218_{16}$ |
| In2 | $S218_5$ | $S218_{12}$ |
| In3 | $S218_9$ | $S218_8$ |
| In4 | $S218_{13}$ | $S218_4$ |
| In5 | $S218_2$ | $S218_{15}$ |
| In6 | $S218_6$ | $S218_{11}$ |
| In7 | $S218_{10}$ | $S218_7$ |
| In8 | $S218_{14}$ | $S218_3$ |
| In9 | $S218_3$ | $S218_{14}$ |
| In10 | $S218_7$ | $S218_{10}$ |
| In11 | $S218_{11}$ | $S218_6$ |
| In12 | $S218_{15}$ | $S218_2$ |
| In13 | $S218_4$ | $S218_{13}$ |
| In14 | $S218_8$ | $S218_9$ |
| In15 | $S218_{12}$ | $S218_5$ |
| In16 | $S218_{16}$ | $S218_1$ |

FIG. 17

| | CASE-1 CASE-4 | CASE-2 CASE-3 | DELAY |
|---|---|---|---|
| | Ssw1=L | Ssw1=H | |
| Out1 | $S218_1$ | $S218_{16}$ | 11T |
| Out2 | $S218_5$ | $S218_{12}$ | |
| Out3 | $S218_9$ | $S218_8$ | |
| Out4 | $S218_{13}$ | $S218_4$ | |
| Out5 | $S218_2$ | $S218_{15}$ | 8T |
| Out6 | $S218_6$ | $S218_{11}$ | |
| Out7 | $S218_{10}$ | $S218_7$ | |
| Out8 | $S218_{14}$ | $S218_3$ | |
| Out9 | $S218_3$ | $S218_{14}$ | 5T |
| Out10 | $S218_7$ | $S218_{10}$ | |
| Out11 | $S218_{11}$ | $S218_6$ | |
| Out12 | $S218_{15}$ | $S218_2$ | |
| Out13 | $S218_4$ | $S218_{13}$ | 2T |
| Out14 | $S218_8$ | $S218_9$ | |
| Out15 | $S218_{12}$ | $S218_5$ | |
| Out16 | $S218_{16}$ | $S218_1$ | |

FIG. 18

| | CASE-1<br>CASE-2<br>Ssw2=L | CASE-3<br>CASE-4<br>Ssw2=H |
|---|---|---|
| Dr1 | Out1 | Out16 |
| Dr2 | Out5 | Out12 |
| Dr3 | Out9 | Out8 |
| Dr4 | Out13 | Out4 |
| Dr5 | Out2 | Out15 |
| Dr6 | Out6 | Out11 |
| Dr7 | Out10 | Out7 |
| Dr8 | Out14 | Out3 |
| Dr9 | Out3 | Out14 |
| Dr10 | Out7 | Out10 |
| Dr11 | Out11 | Out6 |
| Dr12 | Out15 | Out2 |
| Dr13 | Out4 | Out13 |
| Dr14 | Out8 | Out9 |
| Dr15 | Out12 | Out5 |
| Dr16 | Out16 | Out1 |

FIG. 19

| | CASE-1 | | CASE-2 | | CASE-3 | | CASE-4 | |
|---|---|---|---|---|---|---|---|---|
| | DATA | DELAY | DATA | DELAY | DATA | DELAY | DATA | DELAY |
| Dr1 | $S218_1$ | 11T | $S218_{16}$ | 11T | $S218_1$ | 2T | $S218_{16}$ | 2T |
| Dr2 | $S218_2$ | 8T | $S218_{15}$ | 8T | $S218_2$ | 5T | $S218_{15}$ | 5T |
| Dr3 | $S218_3$ | 5T | $S218_{14}$ | 5T | $S218_3$ | 8T | $S218_{14}$ | 8T |
| Dr4 | $S218_4$ | 2T | $S218_{13}$ | 2T | $S218_4$ | 11T | $S218_{13}$ | 11T |
| Dr5 | $S218_5$ | 11T | $S218_{12}$ | 11T | $S218_5$ | 2T | $S218_{12}$ | 2T |
| Dr6 | $S218_6$ | 8T | $S218_{11}$ | 8T | $S218_6$ | 5T | $S218_{11}$ | 5T |
| Dr7 | $S218_7$ | 5T | $S218_{10}$ | 5T | $S218_7$ | 8T | $S218_{10}$ | 8T |
| Dr8 | $S218_8$ | 2T | $S218_9$ | 2T | $S218_8$ | 11T | $S218_9$ | 11T |
| Dr9 | $S218_9$ | 11T | $S218_8$ | 11T | $S218_9$ | 2T | $S218_8$ | 2T |
| Dr10 | $S218_{10}$ | 8T | $S218_7$ | 8T | $S218_{10}$ | 5T | $S218_7$ | 5T |
| Dr11 | $S218_{11}$ | 5T | $S218_6$ | 5T | $S218_{11}$ | 8T | $S218_6$ | 8T |
| Dr12 | $S218_{12}$ | 2T | $S218_5$ | 2T | $S218_{12}$ | 11T | $S218_5$ | 11T |
| Dr13 | $S218_{13}$ | 11T | $S218_4$ | 11T | $S218_{13}$ | 2T | $S218_4$ | 2T |
| Dr14 | $S218_{14}$ | 8T | $S218_3$ | 8T | $S218_{14}$ | 5T | $S218_3$ | 5T |
| Dr15 | $S218_{15}$ | 5T | $S218_2$ | 5T | $S218_{15}$ | 8T | $S218_2$ | 8T |
| Dr16 | $S218_{16}$ | 2T | $S218_1$ | 2T | $S218_{16}$ | 11T | $S218_1$ | 11T |

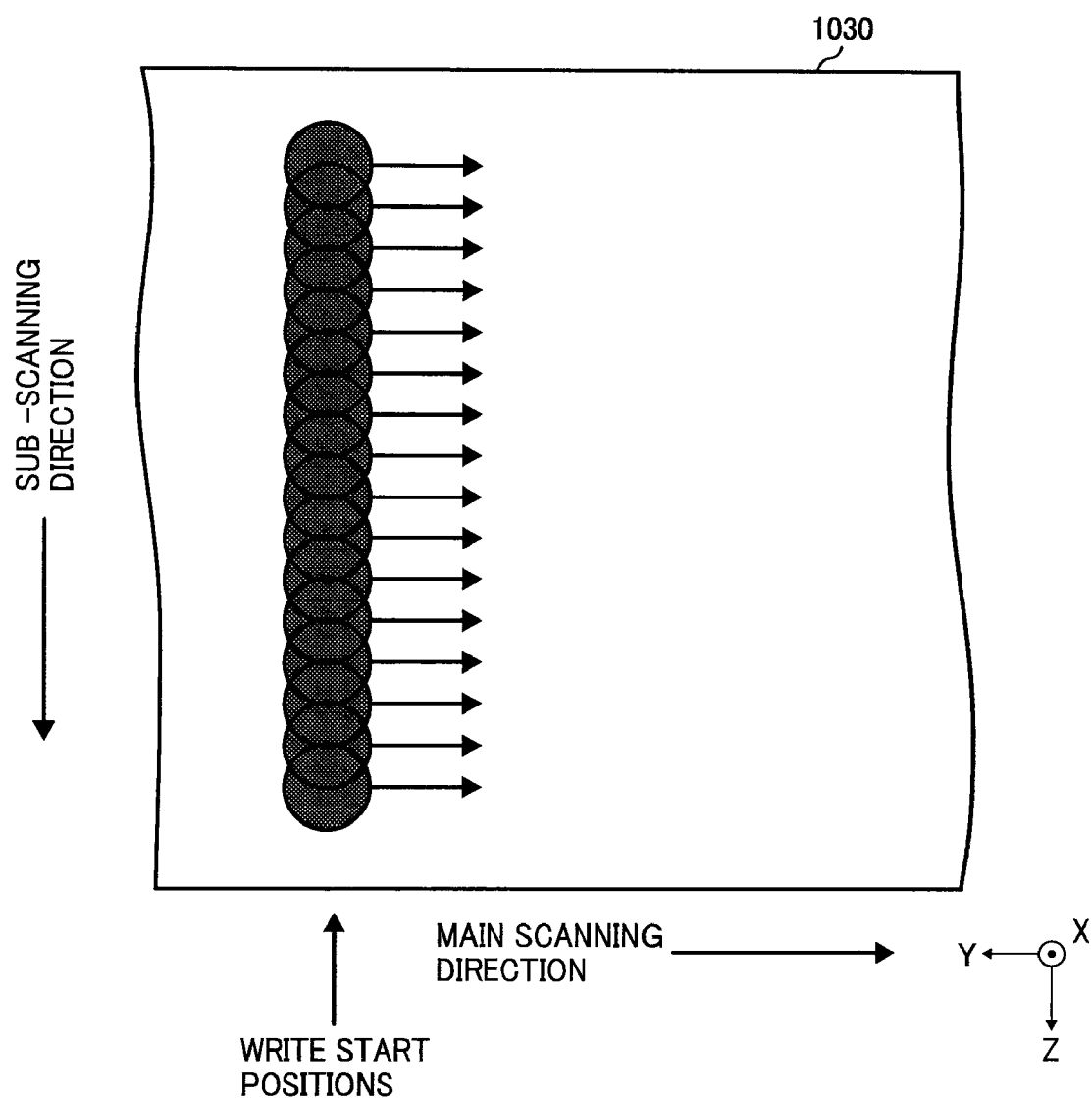

FIG. 23A

|  | ARRANGEMENT OF LIGHT SPOTS | |
|---|---|---|
|  | ARRANGEMENT A | ARRANGEMENT B |
| Ssw1 | L | H |

FIG. 23B

|  | MAIN SCANNING DIRECTION | |
|---|---|---|
|  | −Y DIRECTION | +Y DIRECTION |
| Ssw2 | L | H |

FIG. 24

| Ssw1 | Ssw2 | OUTPUT SIGNAL FROM EOR CIRCUIT |
|---|---|---|
| L | L | L |
| L | H | H |
| H | L | H |
| H | H | L |

LIGHT SOURCE DRIVING DEVICE WITH RELATIONSHIP-BASED DRIVE SIGNAL GENERATING CIRCUIT, OPTICAL SCANNING DEVICE, AND IMAGE FORMING APPARATUS

CROSS-REFERENCE TO RELATED APPLICATIONS

The present application claims priority to and incorporates by reference the entire contents of Japanese priority document 2008-000238 filed in Japan on Jan. 7, 2008.

BACKGROUND OF THE INVENTION

1. Field of the Invention

The present invention relates to a light source driving device, an optical scanning device, and an image forming apparatus. The present invention particularly relates to a light source driving device driving a plurality of light sources, an optical scanning device including the light source driving device, and an image forming apparatus including the optical scanning device.

2. Description of the Related Art

There has been a demand in image forming apparatuses, such as laser printers and digital copiers, to improve the printing speed (fast printing) and the writing density (high image quality). To fulfill such a demand, methods have been developed that employ a multi-beam light source capable of emitting a plurality of light beams simultaneously and scanning a broader area of a target surface with those light beams at one time.

Such a multi-beam light source includes a plurality of light emitting sections arranged at predetermined small intervals in a staggered manner in a main-scanning direction to realize scanning lines that are arranged at the predetermined small intervals. In this configuration, however, it becomes necessary to control the timing of light emission for each light emitting section so as to align write start positions on the respective scanning lines.

For example, Japanese Patent Application Laid-open No. 2003-276234 discloses an image forming apparatus including control means that controls lighting of a plurality of light emitting sections of light source means. In this image forming apparatus, the lighting timing for at least one light emitting section of the light source means is determined based on an image clock generated in synchronization with a detection signal from synchronization detecting means, and the lighting timing for the other light emitting sections is determined by changing the count value of the image clock.

The control means disclosed in Japanese Patent Application Laid-open No. 2003-276234, however, suffers from poor versatility because of limitations on the main-scanning direction and the structure of an optical system. To adapt such control means to other image forming apparatus having at least one different feature regarding the main scanning direction and the structure of the optical system, the circuitry needs to be changed according to the main scanning direction and the structure of the optical system.

SUMMARY OF THE INVENTION

It is an object of the present invention to at least partially solve the problems in the conventional technology.

According to an aspect of the present invention, there is provided a light source driving device for use in an optical scanning device. This optical scanning device includes a plurality of light emitting sections arranged at different positions with respect to at least a direction corresponding to a plurality of scanning lines and each of which operates based on a drive signal, and a scanning section that performs scanning by moving a plurality of light spots, formed on a surface to be scanned by a plurality of light beams emitted from the light emitting sections and propagated through an optical system, along the scanning lines in a main scanning direction, so as to write image information to the surface. The light source driving device includes a write signal generating circuit that generates write signals based on the image information, number of the write signals being equal to number of the light emitting sections; a drive signal generating circuit that generates from the write signals a plurality of drive signals corresponding to the light emitting sections, based on at least one of a) a relationship between an arrangement of the light emitting sections and an arrangement of the light spots, and b) a relationship between the surface and the main scanning direction; and a drive circuit that outputs the drive signals to the light emitting sections in the optical scanning device to drive the light emitting sections.

According to another aspect of the present invention, there is provided an optical scanning device that scans a surface with a plurality of light beams, along a plurality of scanning lines in a main scanning direction. The optical scanning device includes a light source including a plurality of light emitting sections arranged at different positions with regard to at least a direction corresponding to the scanning lines and each of which operates based on a drive signal; a light source driving device that produces the drive signals to drive the light emitting sections in the light source, wherein the light source driving device includes a write signal generating circuit that generates write signals based on the image information, number of the write signals being equal to number of the light emitting sections; a drive signal generating circuit that generates from the write signals a plurality of drive signals corresponding to the light emitting sections, based on at least one of a) a relationship between an arrangement of the light emitting sections and an arrangement of the light spots, and b) a relationship between the surface and the main scanning direction; and a drive circuit that outputs the drive signals to the light emitting sections in the optical scanning device to drive the light emitting sections; and an optical system that enables the light beams emitted from the light source to be converged on the surface, and that moves a plurality of light spots on the surface, along the scanning lines in the main scanning direction.

According to still another aspect of the present invention, there is provided an image forming apparatus including at least one image carrier; and at least one optical scanning device that scans a surface of the image carrier with a plurality of light beams, along a plurality of scanning lines in a main scanning direction. The optical scanning device includes a light source including a plurality of light emitting sections arranged at different positions with regard to at least a direction corresponding to the scanning lines and each of which operates based on a drive signal; a light source driving device that produces the drive signals to drive the light emitting sections in the light source. The light source driving device includes a write signal generating circuit that generates write signals based on the image information, number of the write signals being equal to number of the light emitting sections; a drive signal generating circuit that generates from the write signals a plurality of drive signals corresponding to the light emitting sections, based on at least one of a) a relationship between an arrangement of the light emitting sections and an arrangement of the light spots, and b) a relationship between the surface and the main scanning direction; and a drive circuit that outputs the drive signals to the light emitting sections in the optical scanning device to drive the light emitting sections; and an optical system that enables the light beams emitted from the light source to be converged on the surface, and that moves a plurality of light spots on the surface, along the scanning lines in the main scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a tabular representation of combinations between main scanning directions and arrangements of a plurality of light spots;

FIG. 10 is an illustration of CASE-1 indicated in FIG. 9.

FIG. 17 depicts a correspondence relationship between output signals output from the delay circuits, and signals from line buffers shown in FIG. 4;

FIG. 18 depicts a setting result in a second data switching circuit shown in FIG. 5;

FIG. 19 is a table of drive signals to be input to a light source drive circuit shown in FIG. 4;

FIG. 20 is an illustration of write start positions on a plurality of scanning lines in CASE-1 or CASE-2;

FIG. 23A is a table for explaining the signal Ssw1 when the write control circuit shown in FIG. 22 is used;

FIG. 23B is a table for explaining the signal Ssw2 when the write control circuit shown in FIG. 22 is used;

FIG. 24 is a table for explaining operations performed by an EOR circuit shown in FIG. 22;

DETAILED DESCRIPTION OF THE PREFERRED EMBODIMENTS

Figure 1:
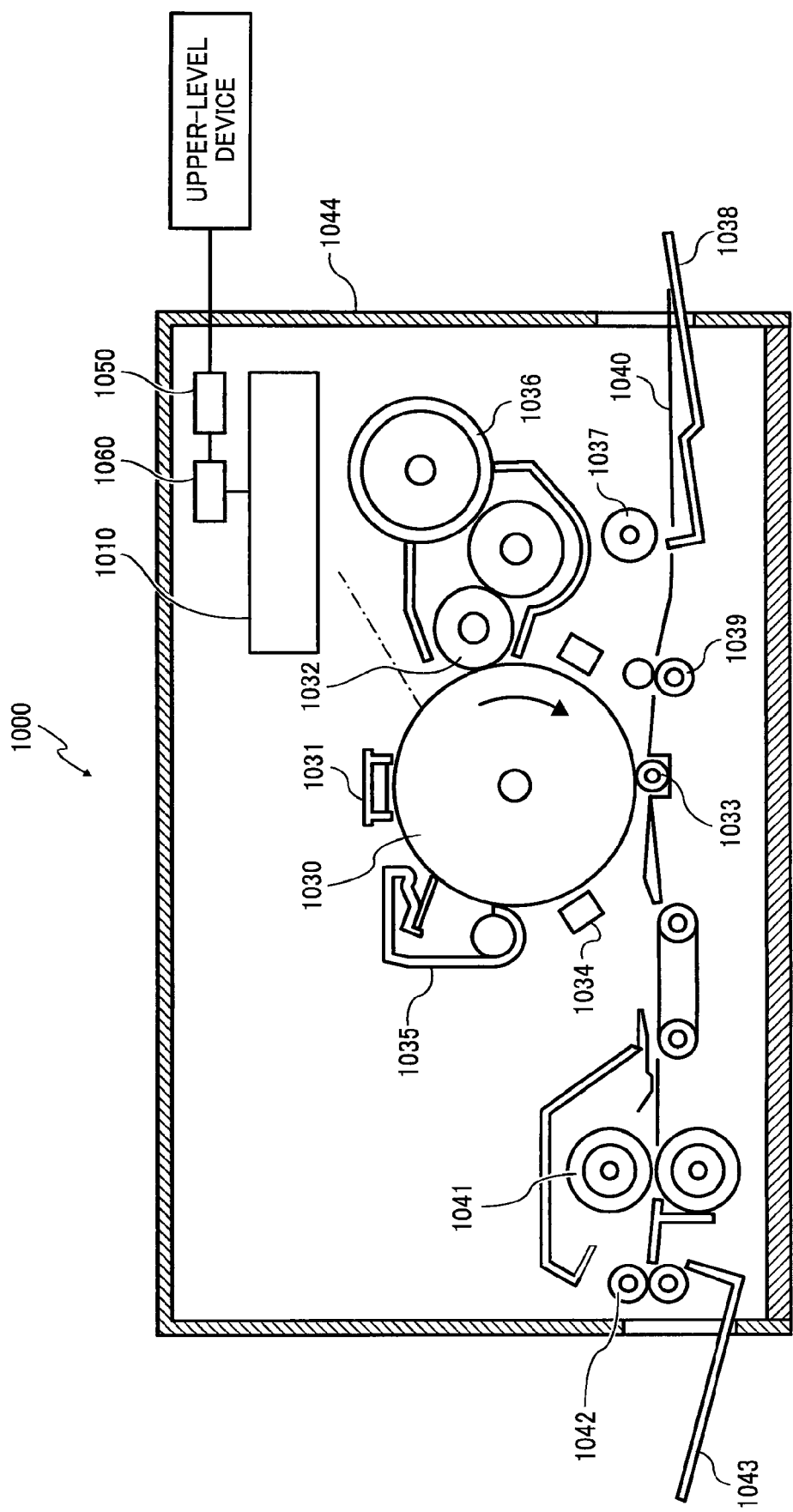
FIG. 1 is a schematic diagram of a laser printer according to an embodiment of the present invention.

Exemplary embodiments of the present invention are described with reference to FIGS. 1 to 21. FIG. 1 is a schematic diagram of a laser printer 1000 serving as an image forming apparatus according to an embodiment of the present invention.

The laser printer 1000 includes an optical scanning device 1010, a photosensitive drum 1030, an electric charger 1031, a developing roller 1032, a transfer charger 1033, a charge neutralizing unit 1034, a cleaning unit 1035, a toner cartridge 1036, a feed skid 1037, a paper feed tray 1038, a pair of registration rollers 1039, fixing rollers 1041, discharge paper rollers 1042, a discharge paper tray 1043, a communication controller 1050, and a printer controller 1060 that performs overall control of the above elements. All the elements are provided at predetermined positions inside a printer housing 1044.

The communication controller 1050 controls bidirectional communication with an upper-level device (e.g., computer) via a network.

The photosensitive drum 1030 is a cylindrical member, having a surface coated with a photosensitive layer (a layer of photosensitive material). In other words, the surface of the photosensitive drum 1030 is a surface to be scanned. The photosensitive drum 1030 rotates in a direction shown by an arrow in FIG. 1.

The electric charger 1031, the developing roller 1032, the transfer charger 1033, the charge neutralizing unit 1034, and the cleaning unit 1035 are arranged near and around the surface of the photosensitive drum 1030, in this order in a rotational direction of the photosensitive drum 1030.

The electric charger 1031 uniformly charges the surface of the photosensitive drum 1030.

The optical scanning device 1010 irradiates the surface of the photosensitive drum 1030, charged by the electric charger 1031, with light beams modulated based on image information provided from an upper-level device. Accordingly, a latent image corresponding to the image information is formed on the surface of the photosensitive drum 1030. The formed latent image is moved toward the developing roller 1032 as the photosensitive drum 1030 rotates. The structure of the optical scanning device 1010 will be described in detail later.

The toner cartridge 1036 contains toner to be supplied to the developing roller 1032.

The developing roller 1032 causes the toner, supplied from the toner cartridge 1036, to be adhered to the latent image formed on the surface of the photosensitive drum 1030, so as to visualize the image information. The latent image with the toner adhered (hereinafter, "toner image") is moved toward the transfer charger 1033 as the photosensitive drum 1030 rotates.

The paper feed tray 1038 holds recording sheets 1040. Near the paper feed tray 1038 is provided the feed skid 1037 that takes each of the recording sheets 1040 from the paper feed tray 1038, and conveys it to the pair of registration rollers 1039. The pair of registration rollers 1039 once hold the recording sheet 1040 taken by the feed skid 1037, and sends it out to the gap between the photosensitive drum 1030 and the transfer charger 1033 in synchronization with the rotation of the photosensitive drum 1030.

The transfer charger 1033 is applied with a voltage having an opposite polarity to the toner so as to electrically attract the toner on the surface of the photosensitive drum 1030 to the recording sheet 1040. Upon application of the voltage, the toner image on the surface of the photosensitive drum 1030 is transferred to the recording sheet 1040. The recording sheet 1040 carrying the transferred toner image is sent to the fixing rollers 1041.

The fixing rollers 1041 apply heat and pressure to the recording sheet 1040, thereby fixing the toner image on the recording sheet 1040. The recording sheet 1040 with the toner image fixed is sent to the discharge paper tray 1043 through the discharge paper rollers 1042, and stacked in the discharge paper tray 1043 one by one.

The charge neutralizing unit 1034 electrically neutralizes the surface of the photosensitive drum 1030.

The cleaning unit 1035 removes the toner (residual toner) remaining on the surface of the photosensitive drum 1030. The surface of the photosensitive drum 1030 with the residual toner removed is brought to a position again where it faces the electric charger 1031.

Figure 2:
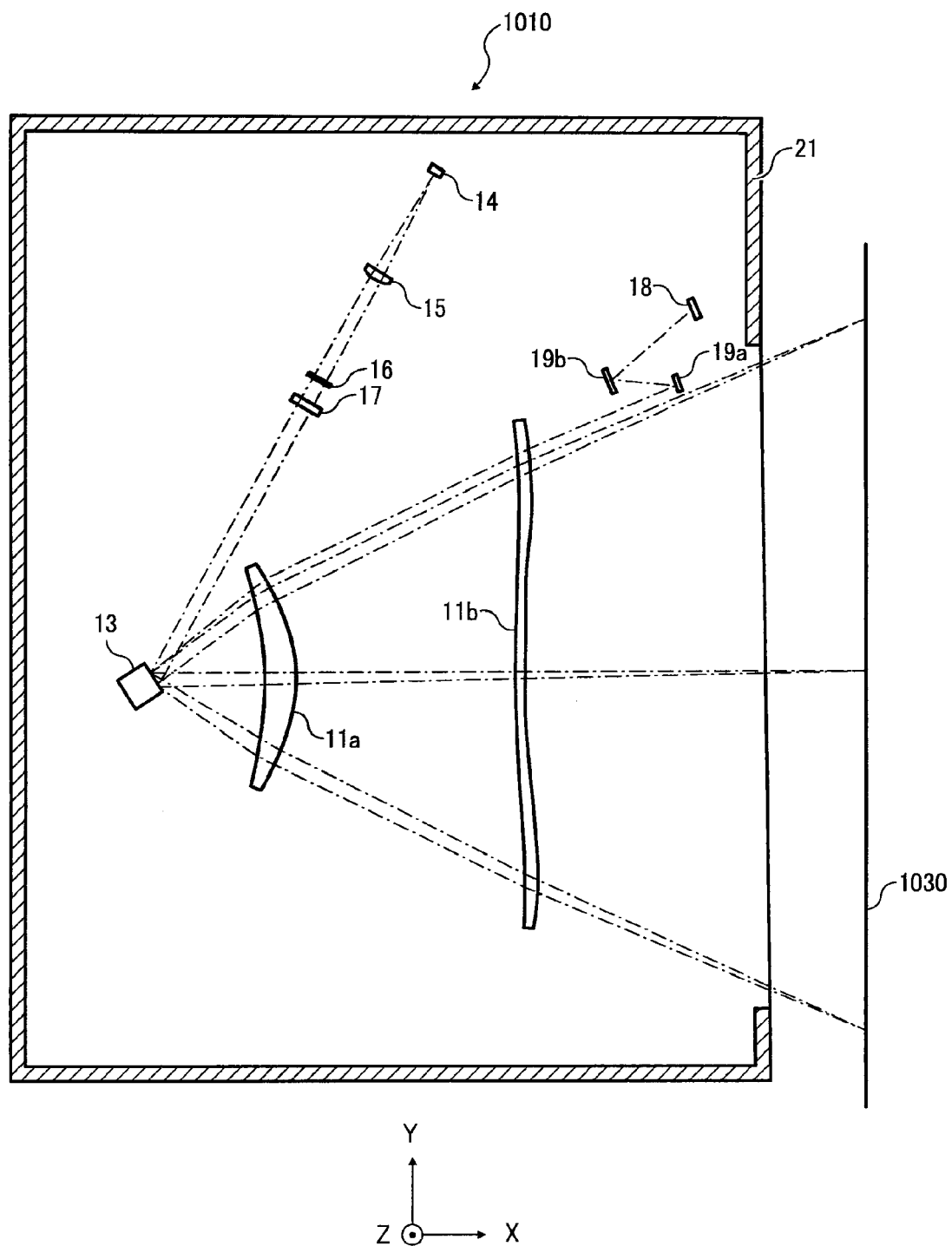
FIG. 2 is a schematic of an optical scanning device shown in FIG. 1.

The detail structure of the optical scanning device 1010 is shown in FIG. 2. As shown in FIG. 2, the optical scanning device 1010 includes a deflector-side scanning lens 11a, an image-side scanning lens 11b, a polygon mirror 13, a light source 14, a coupling lens 15, an apertured plate 16, a cylindrical lens 17, a synchronization detection sensor 18, two synchronization detecting mirrors (19a and 19b), and a scanning controller 22 (not shown in FIG. 2, see FIG. 4). At least one folding mirror (not shown) is disposed on at least either an optical path between the deflector-side scanning lens 11a and the image-side scanning lens 11b, or an optical path between the image-side scanning lens 11b and the photosensitive drum 1030. These elements are installed at predetermined positions inside a housing 21.

In the present specification, in an XYZ three-dimensional orthogonal coordinate system, a length direction of the photosensitive drum 1030 is defined as Y-axis direction, and a direction along an optical axis of the scanning lenses (11a and 11b) is defined as X-axis direction.

Figure 3:
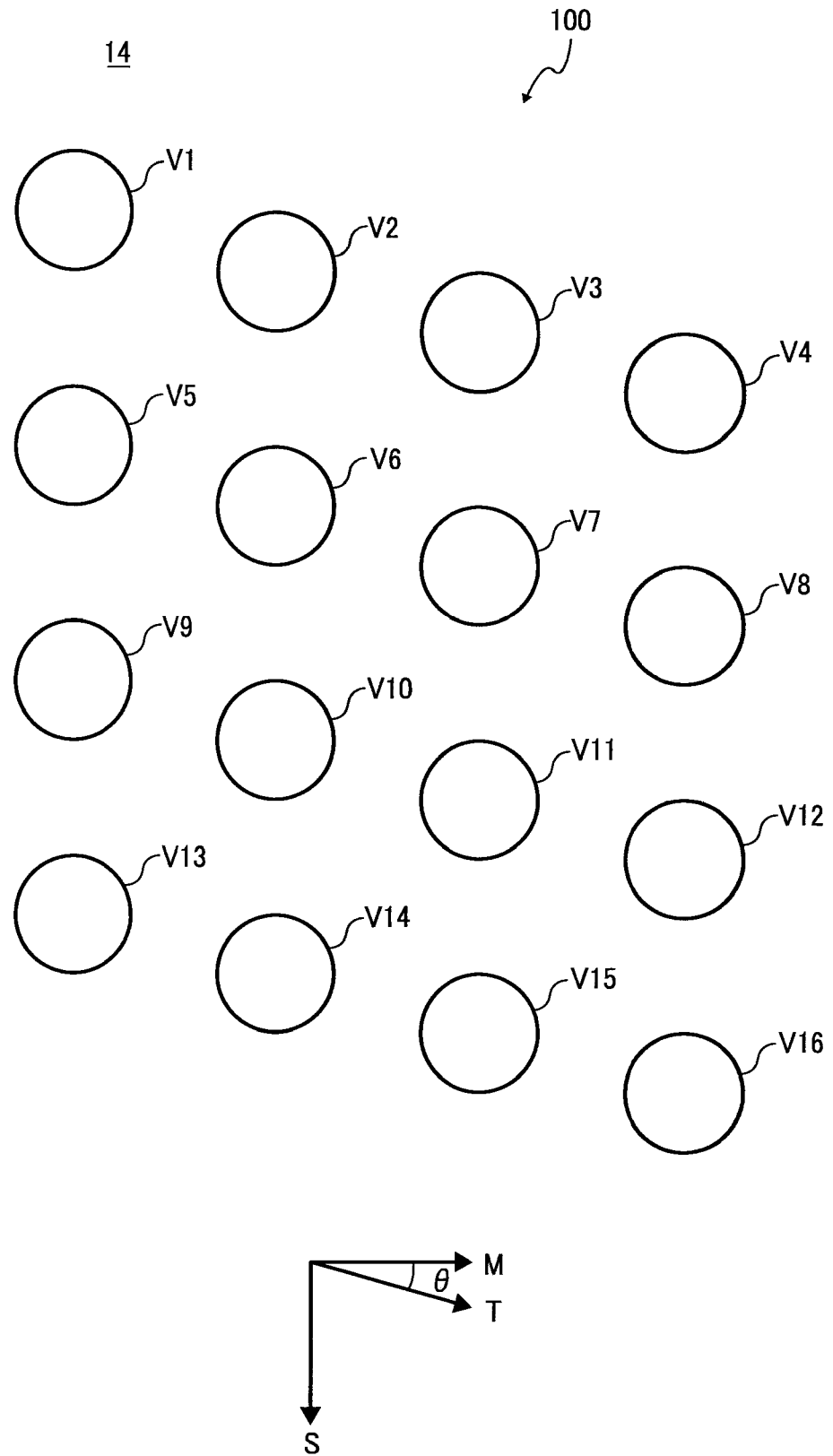
FIG. 3 is an illustration of a surface emitting laser array included in a light source shown in FIG. 2.

As shown in FIG. 3, for example, the light source 14 includes a two-dimensional (2D) array 100 including 16 light emitting sections that are arranged two-dimensionally on a single substrate (not shown).

In FIG. 3, M direction corresponds to a direction in which the scanning lines extend across the surface of the photosensitive drum 1030, and S direction is orthogonal to the M direction (the S direction is the same as the Z-axis direction shown in FIG. 2). T direction is a direction inclined with respect to the M direction toward the S direction by an inclination angle $\theta$ ($0° < \theta < 90°$).

In the 2D array 100, four one directional arrays each including four light emitting sections spaced at equal intervals are arranged along the T direction. The four arrays of the light emitting sections are arranged at equal intervals in the S direction so that all the light emitting sections are orthographically-projected at equal intervals on virtual lines extending in the S direction. In other words, 16 light emitting sections are two-dimensionally arranged along the T and the S directions. In the present specification, "an interval between light emitting sections" means a distance between center points of any two adjacent light emitting sections. With this arrangement, the surface of the photosensitive drum 1030 can be scanned with 16 light beams at the same time.

For convenience sake, a first light emitting array, a second light emitting array, and a third light emitting array, and a fourth light emitting array are arranged from top to bottom of the sheet shown in FIG. 3. Furthermore, the first light emitting array includes four light emitting sections V1 to V4, the second light emitting array includes four light emitting sections V5 to V8, the third light emitting array includes four light emitting sections V9 to V12, and the fourth light emitting array includes four light emitting sections V13 to V16.

Each light emitting section can be a vertical cavity surface emitting laser (VCSEL) having an oscillation wavelength in 780 nanometer band. Specifically, the 2D array 100 is a so-called surface emitting laser array.

Referring back to FIG. 2, the coupling lens 15 substantially collimates the light beams emitted from the light source 14.

The apertured plate 16 has apertures that define the diameters of the light beams when the light beams through the coupling lens 15.

The cylindrical lens 17 focuses the light beams, which have passed through the apertured plate 16, so as to form images near a deflecting and reflecting surface of the polygon mirror 13 and along a sub-scanning direction (the Z-axis direction).

An optical system disposed on an optical path between the light source 14 and the polygon mirror 13 will be called a pre-deflector optical system. In the present embodiment, the coupling lens 15, the apertured plate 16, and the cylindrical lens 17 constitute a pre-deflector optical system.

The polygon mirror 13 has a plurality of mirror facets each serving as a deflecting and reflecting surface. In the present embodiment, the polygon mirror 13 has four mirror facets. The polygon mirror 13 rotates about an axis parallel to the sub-scanning direction (the Z-axis direction) at a constant speed. The light beams that have been focused by the cylindrical lens 17 are deflected towards the deflector-side scanning lens 11a because of the rotation of the polygon mirror 13.

The deflector-side scanning lens 11a is disposed on an optical path of the light beams deflected by the polygon mirror 13.

The image-side scanning lens 11b is disposed on an optical path of the light beams propagated through the deflector-side scanning lens 11a.

The light beams propagated through the deflector-side scanning lens 11a, the image-side scanning lens 11b, and a folding mirror(s) (not shown) are converged on the surface of the photosensitive drum 1030. As a result, a light spot is formed on the surface of the photosensitive drum 1030. The light spot moves along the length direction of the photosensitive drum 1030 because of the rotation of the polygon mirror 13. In other words, the surface of the photosensitive drum 1030 is scanned by the light spot. The direction of movement of the light spot is called the "main scanning direction".

An optical system disposed on an optical path between the polygon mirror 13 and the photosensitive drum 1030 will be called a scanning optical system. In the present embodiment, the deflector-side scanning lens 11a, the image-side scanning lens 11b, and a folding mirror(s) (not shown) constitute the scanning optical system.

From among the light beams deflected by the polygon mirror 13 and propagated through the scanning optical system, a portion not including image information to be written strikes the synchronization detecting mirrors 19a and 19b, and is deflected toward and enters the synchronization detection sensor 18.

The synchronization detection sensor 18 generates a photoelectric conversion signal indicative of the amount of the received light, and outputs this signal to the scanning controller 22.

Figure 4:
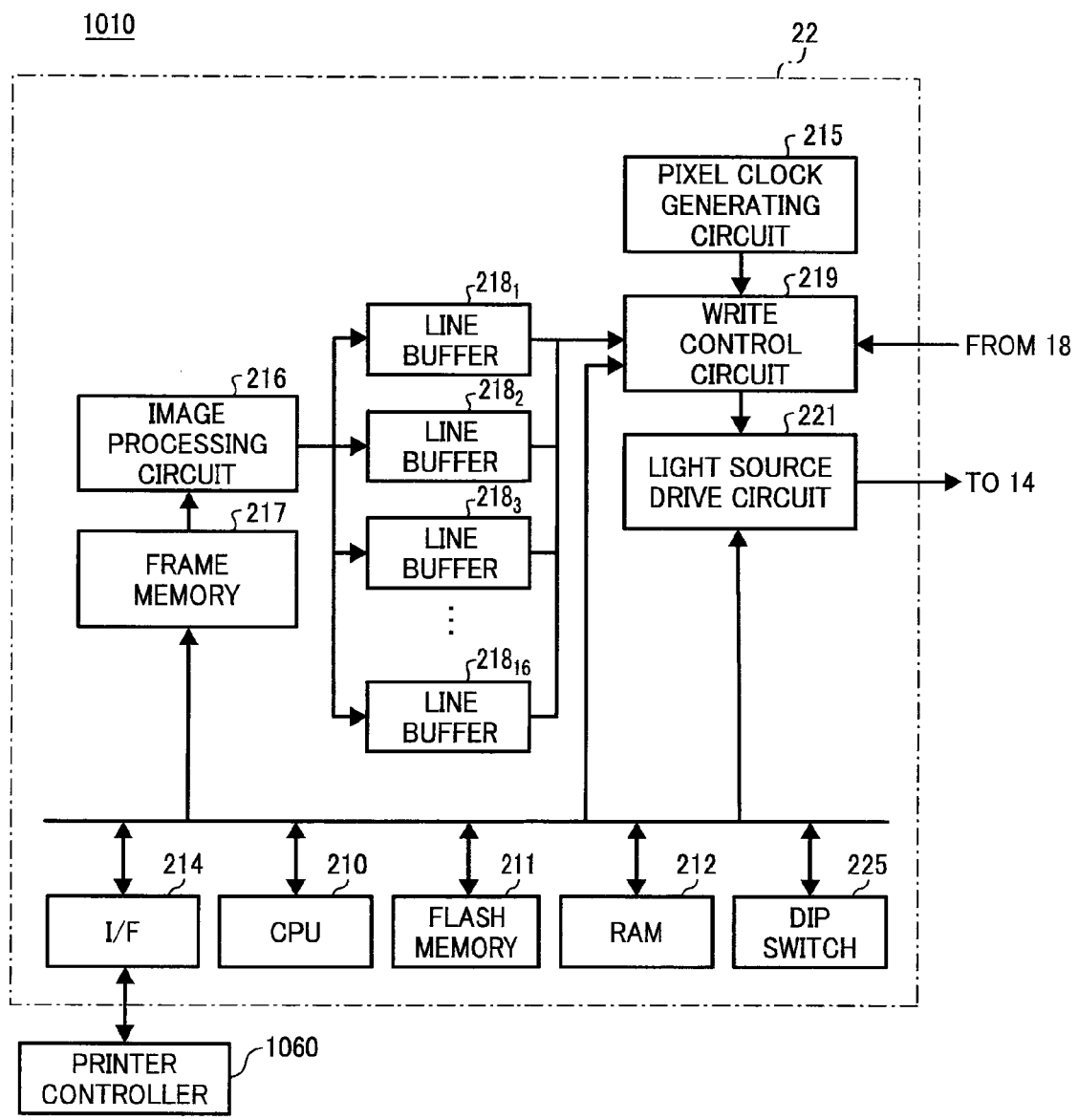
FIG. 4 is a schematic block diagram of a scanning controller included in the laser printer shown in FIG. 1.

As shown in FIG. 4, for example, the scanning controller 22 includes a central processing unit (CPU) 210, a flash memory 211, a random access memory (RAM) 212, an interface (I/F) 214, a pixel clock generating circuit 215, an image processing circuit 216, a frame memory 217, line buffers $218_1$ to $218_{16}$, a write control circuit 219, a light source drive circuit 221, and a dual in-line package (DIP) switch 225. The arrows in FIG. 4 indicate flow of signals and/or information, not all the block connections.

The I/F 214 is a communication interface that controls bidirectional communication with the printer controller 1060. The scanning controller 22 receives image data from the upper-level device shown in FIG. 1 via the I/F 214.

The pixel clock generating circuit 215 generates a pixel clock signal.

The frame memory 217 temporary stores therein image data developed into raster image data by the CPU 210 (hereinafter, "raster data").

The image processing circuit 216 reads out the raster data from the frame memory 217, and performs predetermined halftone processing on the data. The image processing circuit 216 then generates dot data for each light emitting section, and outputs the dot data to the line buffers $218_1$ to $218_{16}$. Assuming that an arrangement of a plurality of light spots formed on the surface of the photosensitive drum 1030 is the same as the arrangement of the light emitting sections in the 2D array 100 (see FIG. 10), the number of line buffers $218_1$ to $218_{16}$ is equal to the number of light emitting sections (i.e., the number of light spots). Specifically, +S direction in the 2D array 100 corresponds to the sub-scanning direction. Thus, dot data for the light emitting section V1 is stored in the line buffer $218_1$, dot data for the light emitting section V2 is stored in the line buffer $218_2$, and so on. Dot data for the light emitting section V16 is stored in the line buffer $218_{16}$.

Figure 5:
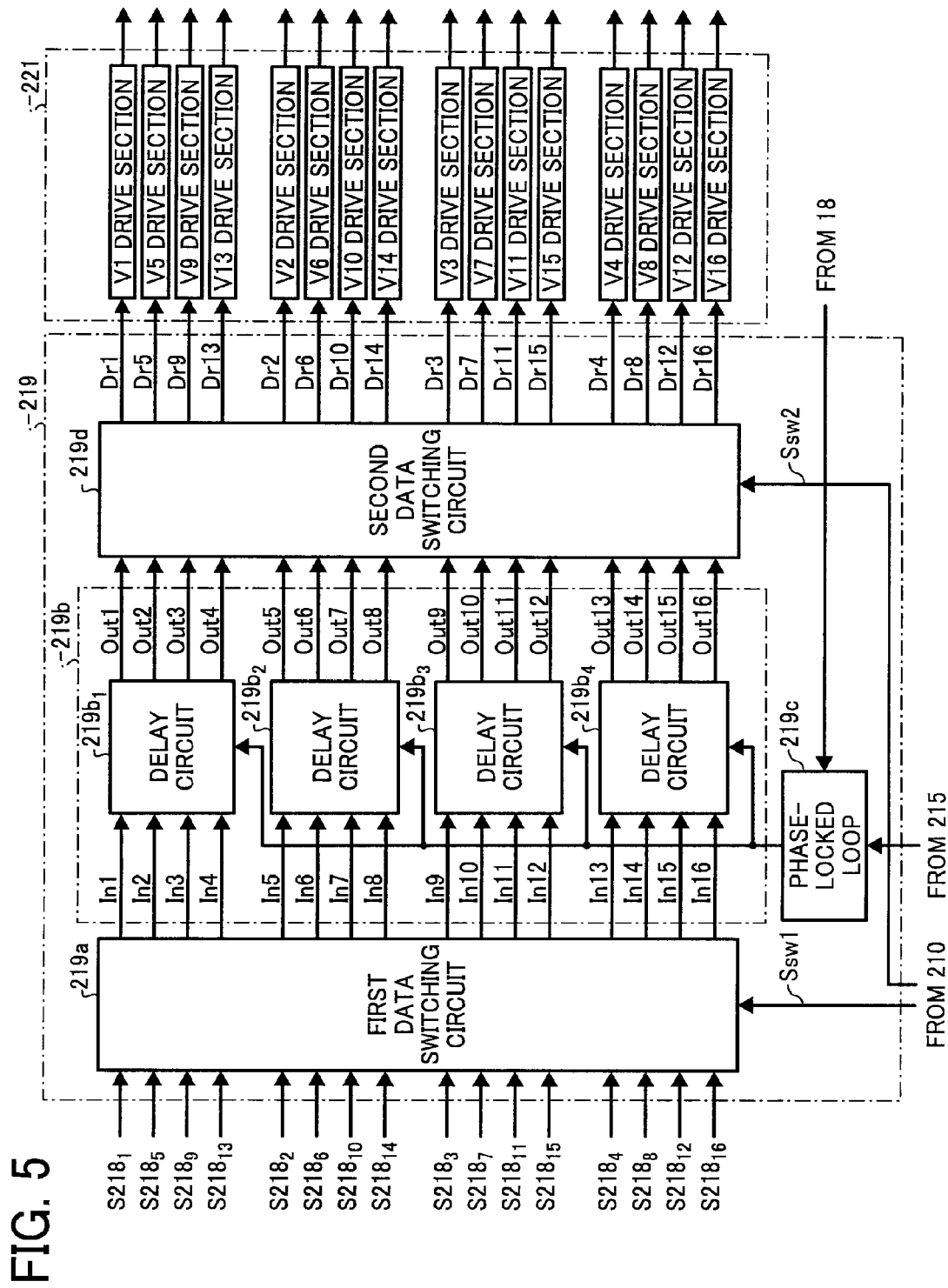
FIG. 5 is a schematic diagram of a write control circuit shown in FIG. 4.

As shown in FIG. 5, the light source drive circuit 221 includes a plurality of drive sections (V1 to V16 drive sections) corresponding to a plurality of the light emitting sections (V1 to V16). The drive sections receive corresponding drive signals (Dr1 to Dr16) from the write control circuit 219. Each drive section outputs an output signal to a corresponding one of the light emitting sections in the light source 14. Specifically, the light emitting section V1 is driven by the V1 drive section based on the drive signal Dr1, the light emitting section V2 is driven by the V2 drive section based on the drive signal Dr2, and so on. The light emitting section V16 is driven by the V16 drive section based on the drive signal Dr16.

The write control circuit 219 includes a first data switching circuit 219a, a delay circuitry 219b, a phase-locked loop 219c, and a second data switching circuit 219d, as shown in FIG. 5.

The phase-locked loop 219c synchronizes a pixel clock signal from the pixel clock generating circuit 215 with a synchronization signal from the synchronization detection sensor 18.

The delay circuitry 219b includes four delay circuits ($219b_1$, $219b_2$, $219b_3$, and $219b_4$) having different delay times. Each of the delay circuits includes a plurality of delay sections for respective input signals (see FIG. 6).

Figures 6, 7:
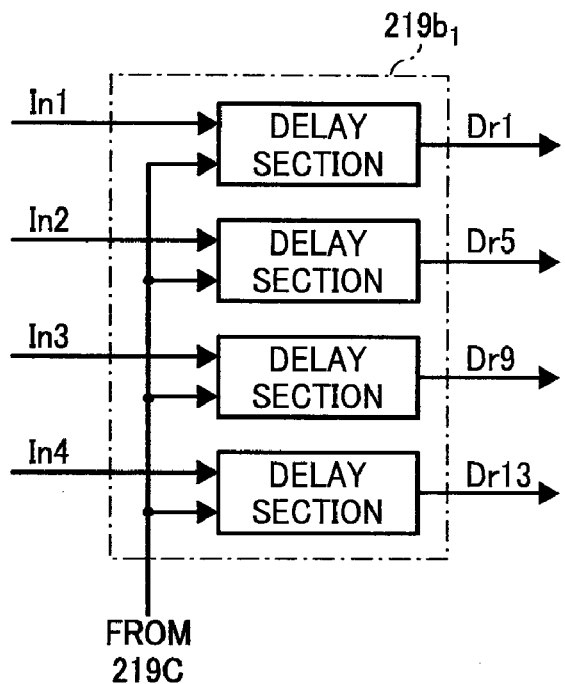
FIG. 6 is a schematic of a delay circuit shown in FIG. 5.
FIG. 7 is a tabular representation of delay times set in each of the delay circuits shown in FIG. 5.

As shown in FIG. 7, the delay circuit $219b_1$ has a delay time 11T (T is a cycle of a pixel clock signal), the delay circuit $219b_2$ has a delay time 8T, the delay circuit $219b_3$ has a delay time 5T, and the delay circuit $219b_4$ has a delay time 2T. The delay times are not limited to these values.

The delay circuit $219b_1$ receives input signals (In1 to In4), and outputs signals (Out1 to Out4) with a delay of 11T.

The delay circuit $219b_2$ receives input signals (In5 to In8), and outputs signals (Out5 to Out8) with a delay of 8T.

The delay circuit $219b_3$ receives input signals (In9 to In12), and outputs signals (Out9 to Out12) with a delay of 5T.

The delay circuit $219b_4$ receives input signals (In13 to In16), and outputs signals (Out13 to Out16) with a delay of 2T.

Figure 8:
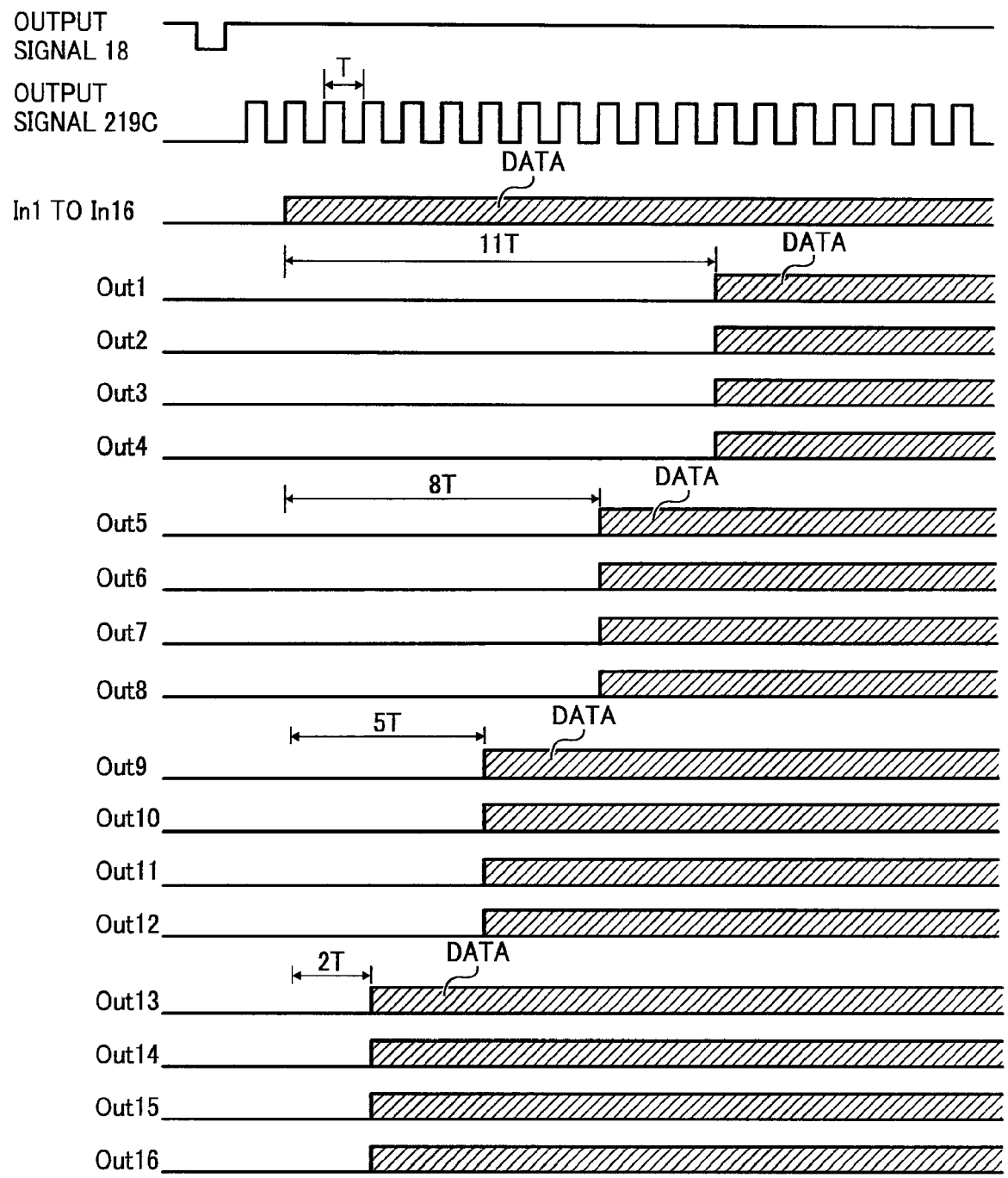
FIG. 8 is a timing chart of output signals output from the respective delay circuits with the delay times shown in FIG. 7.
Figure 11:
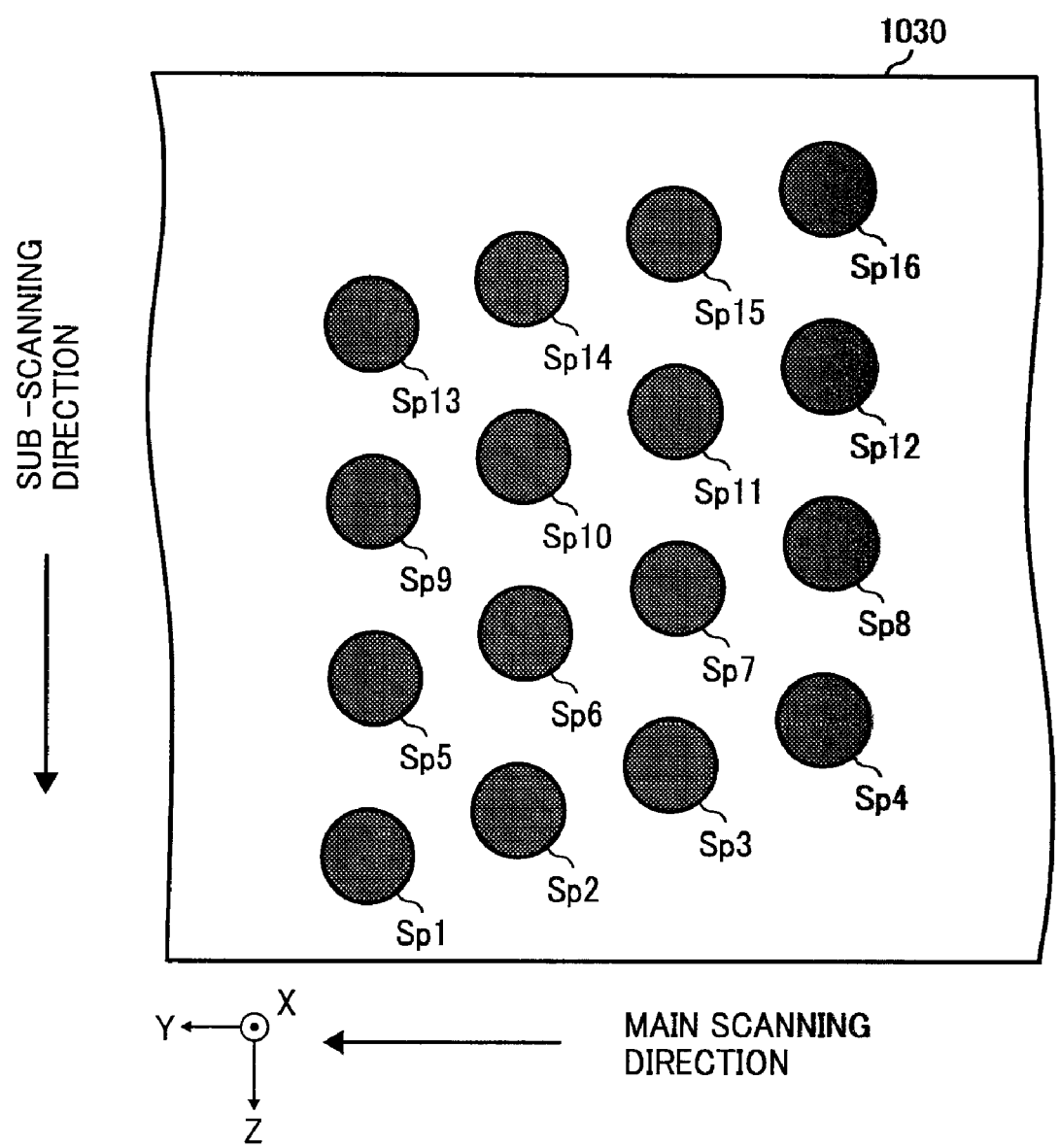
FIG. 11 is an illustration of CASE-2 indicated in FIG. 9.
Figure 12:
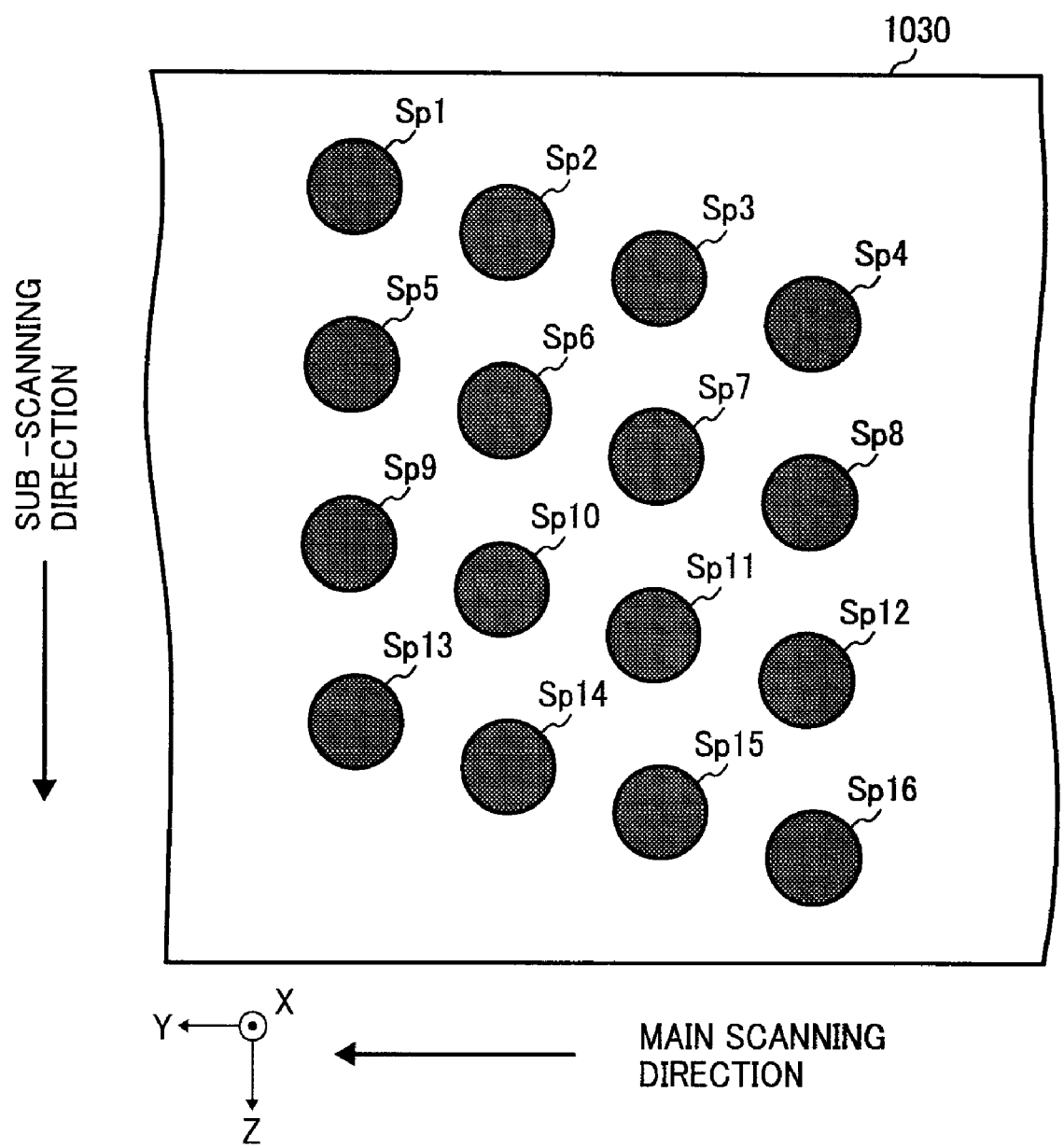
FIG. 12 is an illustration of CASE-3 indicated in FIG. 9.

FIG. 8 is a timing chart of output signals (Out1 to Out16) output from the delay circuitry 219b.

Referring back to FIG. 5, the first data switching circuit 219a receives signals ($S218_1$ to $S218_{16}$) from the line buffers. The first data switching circuit 219a sets a correspondence relationship between the signals from the line buffers and the input signals (In1 to In16) to the delay circuitry 219b based on a signal Ssw1 received from the CPU 210.

The second data switching circuit 219d receives the output signals (Out1 to Out16) from the delay circuitry 219b. The second data switching circuit 219d sets a correspondence relationship between the output signals output from the delay circuitry 219b and the drive signals (Dr1 to Dr16) based on a signal Ssw2 received from the CPU 210.

Depending on the structure of the scanning optical system, two arrangements are considered as an arrangement of a plurality of light spots to be formed on the surface of the photosensitive drum 1030 when all the light emitting sections in the 2D array 100 light up at the same time. Specifically, one is an arrangement being the same as the arrangement of the light emitting sections in the 2D array 100 (hereinafter, "arrangement A"), and the other is an arrangement obtained by turning the arrangement A upside down (hereinafter, "arrangement B"). In the arrangement A, the +S direction in the 2D array 100 corresponds to the sub-scanning direction. In the B arrangement, −S direction in the 2D array 100 corresponds to the sub-scanning direction.

With regard to the main scanning direction, two arrangements are also considered: in −Y and +Y directions.

As shown in FIG. 9, the write operation is performed to the photosensitive drum 1030 in the following possible combinations: (1) the main scanning direction is −Y direction and the light spots are arrayed in the arrangement A (hereinafter, "CASE-1", see FIG. 10), (2) the main scanning direction is +Y direction and the light spots are arrayed in the arrangement B (hereinafter, "CASE-2". see FIG. 11), (3) the main scanning direction is +Y direction and the light spots are arrayed in the arrangement A (hereinafter, "CASE-3", see FIG. 12), and (4) the main scanning direction is −Y direction and the light spots are arrayed in the arrangement B (hereinafter, "CASE-4", see FIG. 13).

In FIGS. 10 to 13, indicated by Sp1 to Sp16 are light spots corresponding to the light emitting sections V1 to V16.

Figures 13, 14:
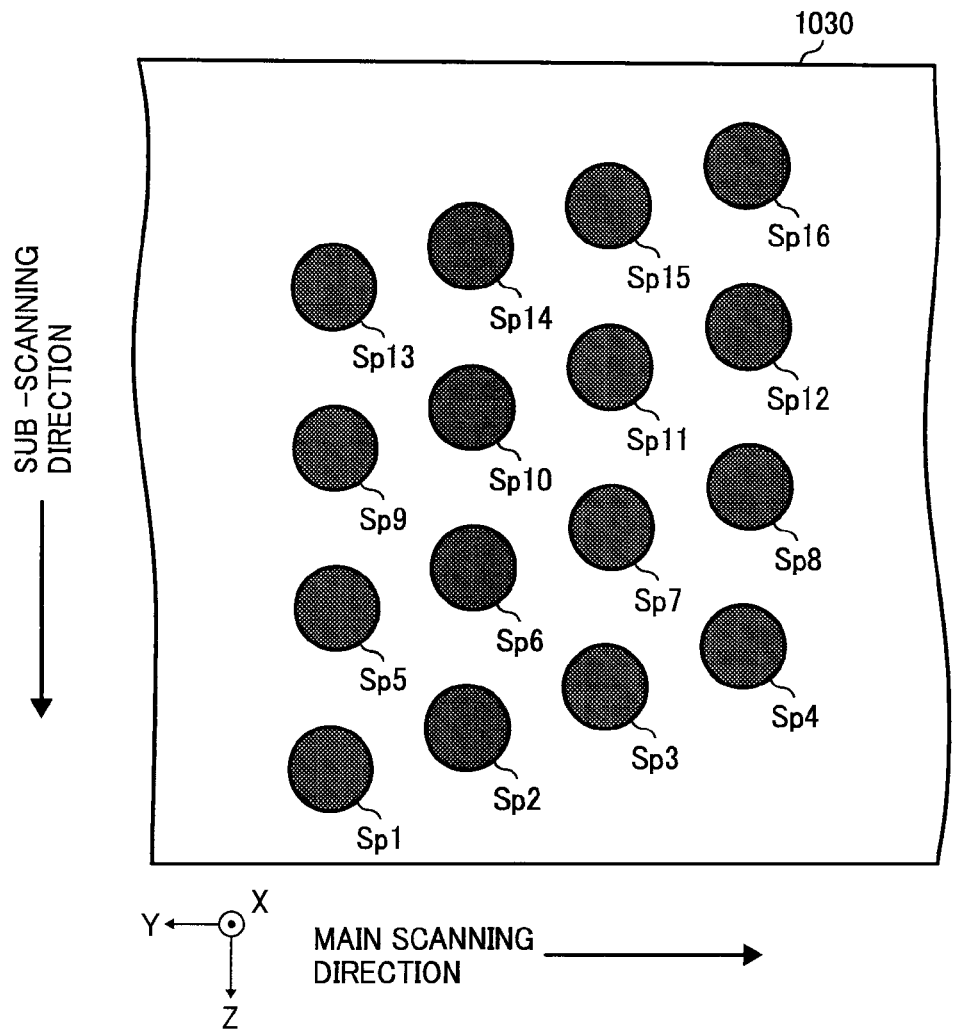
FIG. 13 is an illustration of CASE-4 indicated in FIG. 9.
FIG. 14 is a tabular representation of settings of signals Ssw1 and Ssw2.

As shown in FIG. 14, Ssw1="L" (low logical level) and Ssw2="L" are set in CASE-1, Ssw1="H" (high logical level) and Ssw2="L" are set in CASE-2, Ssw1="H" and Ssw2="H" are set in CASE-3, and Ssw1="L" and Ssw2="H" are set in CASE-4.

Specifically, the first data switching circuit 219a sets the correspondence relationship between the signals from the line buffers and the input signals to the delay circuitry 219b based on the current arrangement of the light spots and the main scanning direction. Moreover, the second data switching circuit 219d sets the correspondence relationship between the output signals of the delay circuitry 219b and the drive signals based on which direction is currently the main scanning direction.

The optical scanning device 1010 can be operated in any one of CASE-1 to CASE-4. An operator appropriately sets sw1 and sw2 of the DIP switch 225, as shown in FIG. 15, during manufacture, adjustment, shipment, and the like.

Figures 15, 16:
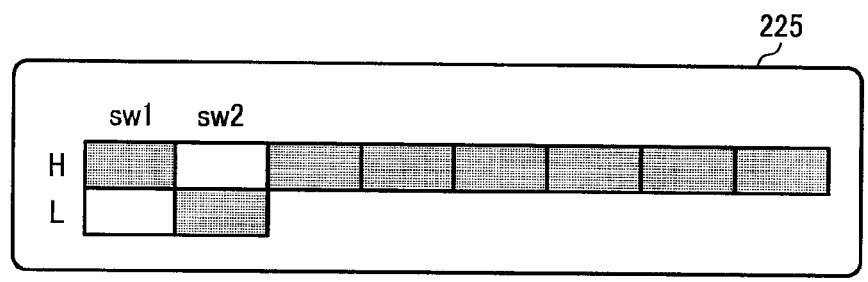
FIG. 15 is a schematic of a DIP switch shown in FIG. 4.
FIG. 16 depicts a setting result in a first data switching circuit shown in FIG. 5.

FIG. 16 depicts a setting result in the first data switching circuit 219a.

FIG. 17 depicts a correspondence relationship between the output signals from the delay circuitry 219b and the signals from the line buffers.

FIG. 18 depicts a determination result in the second data switching circuit 219d.

Based on the determination result, the write control circuit 219 can output the drive signals (Dr1 to Dr16) appropriate for the main scanning direction and the arrangement of the light spots (see FIG. 19).

Referring back to FIG. 4, the flash memory 211 stores therein various computer programs described in codes readable by the CPU 210, and various kinds of information.

The RAM 212 is a working memory.

The CPU 210 operates according to a computer program stored in the flash memory 211, and performs overall control of the optical scanning device 1010.

For example, the CPU 210 obtains information about the setting of the DIP switch 225 during the initial setting. The CPU 210 sets the signal Ssw1 to "H" if the sw1 of the DIP switch 225 has been set to "H", and sets the signal Ssw1 to "L" if the sw1 has been set to "L". On the other hand, the CPU 210 sets the signal Ssw2 to "H" if the sw2 of the DIP switch 225 has been set to "H", and sets the signal Ssw2 to "L" if the sw2 has been set to "L". In this way, determination is made as to which of CASE-1 to CASE-4 is adopted to operate the optical scanning device 1010.

Figure 21:
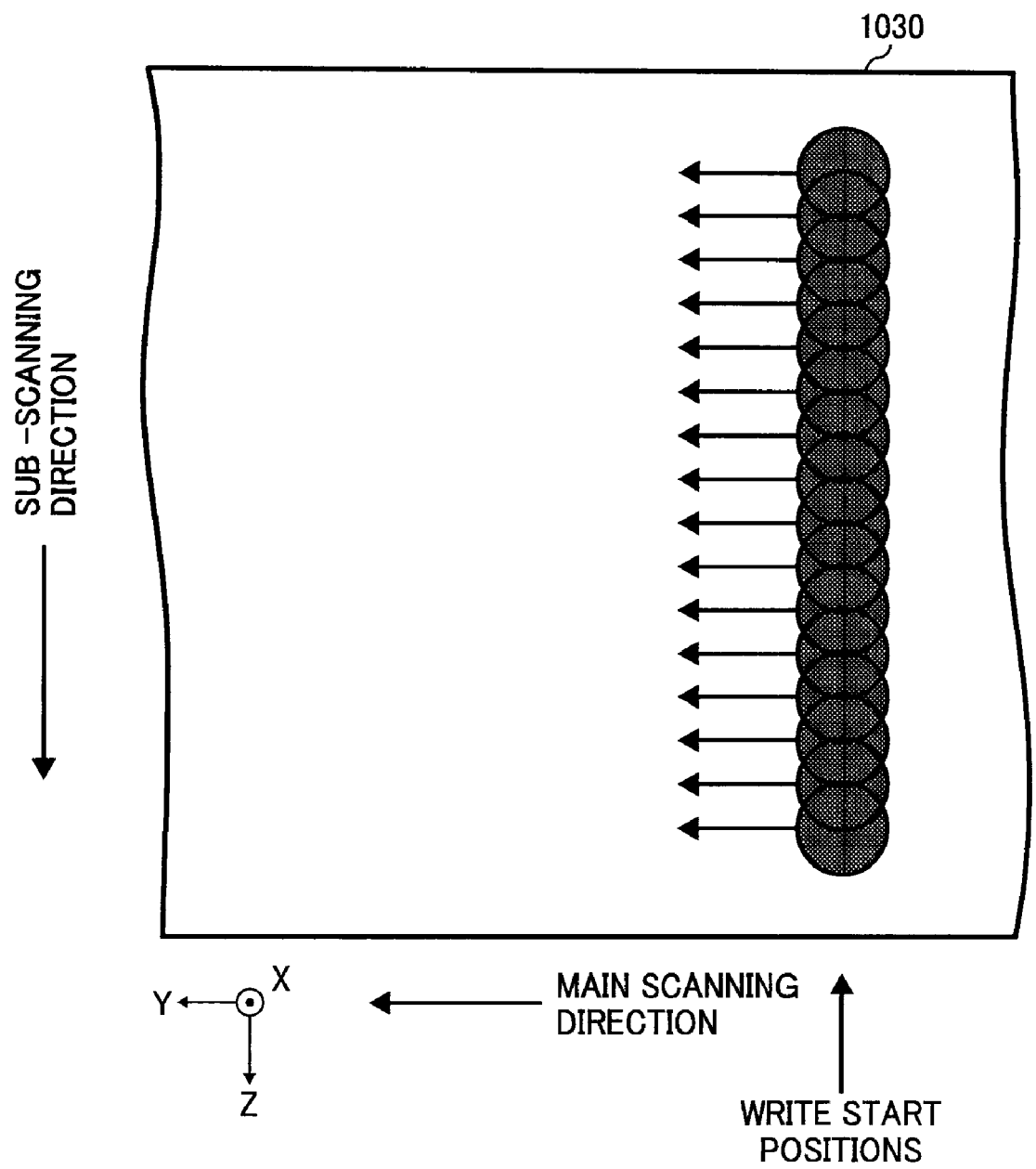
FIG. 21 is an illustration of write start positions on the scanning lines in CASE-3 or CASE-4.

FIG. 20 depicts where the write operation starts on the scanning lines when CASE-1 or CASE-2 is adopted, and FIG. 21 depicts where the write operation starts on the scanning lines when CASE-3 or CASE-4 is adopted. In either case, the write operation can start at aligned positions on the scanning lines.

In this manner, in the optical scanning device 1010, the scanning controller 22 functions as a light source driving device.

The image processing circuit 216 functions as a write signal generating circuit, the light source drive circuit 221 functions as a drive circuit, and the CPU 210 and the write control circuit 219 function as a drive signal generating circuit.

The delay circuitry 219b functions as a plurality of delay circuits. The CPU 210, the first data switching circuit 219a, and the second data switching circuit 219d function as a control device.

As to processing of computer programs run by the CPU 210, at least a portion of or the entire processing may be implemented in hardware.

As described, with the optical scanning device 1010, the scanning controller 22 can start write operation at aligned positions on the scanning lines in any of CASE-1 to CASE-4. Furthermore, the scanning controller 22 can drive the light emitting sections so as to form a desirable latent image on the surface of the photosensitive drum 1030. The scanning controller 22 has such excellent versatility, achieving low cost. Accordingly, the optical scanning device 1010 can speedily perform high-density optical scanning, without cost increase.

The laser printer 1000, which includes the optical scanning device 1010, can speedily form high quality images without cost increase.

Although the 2D array 100 includes 16 light emitting sections in the above embodiment, the present invention is not limited to this arrangement.

Figure 22:
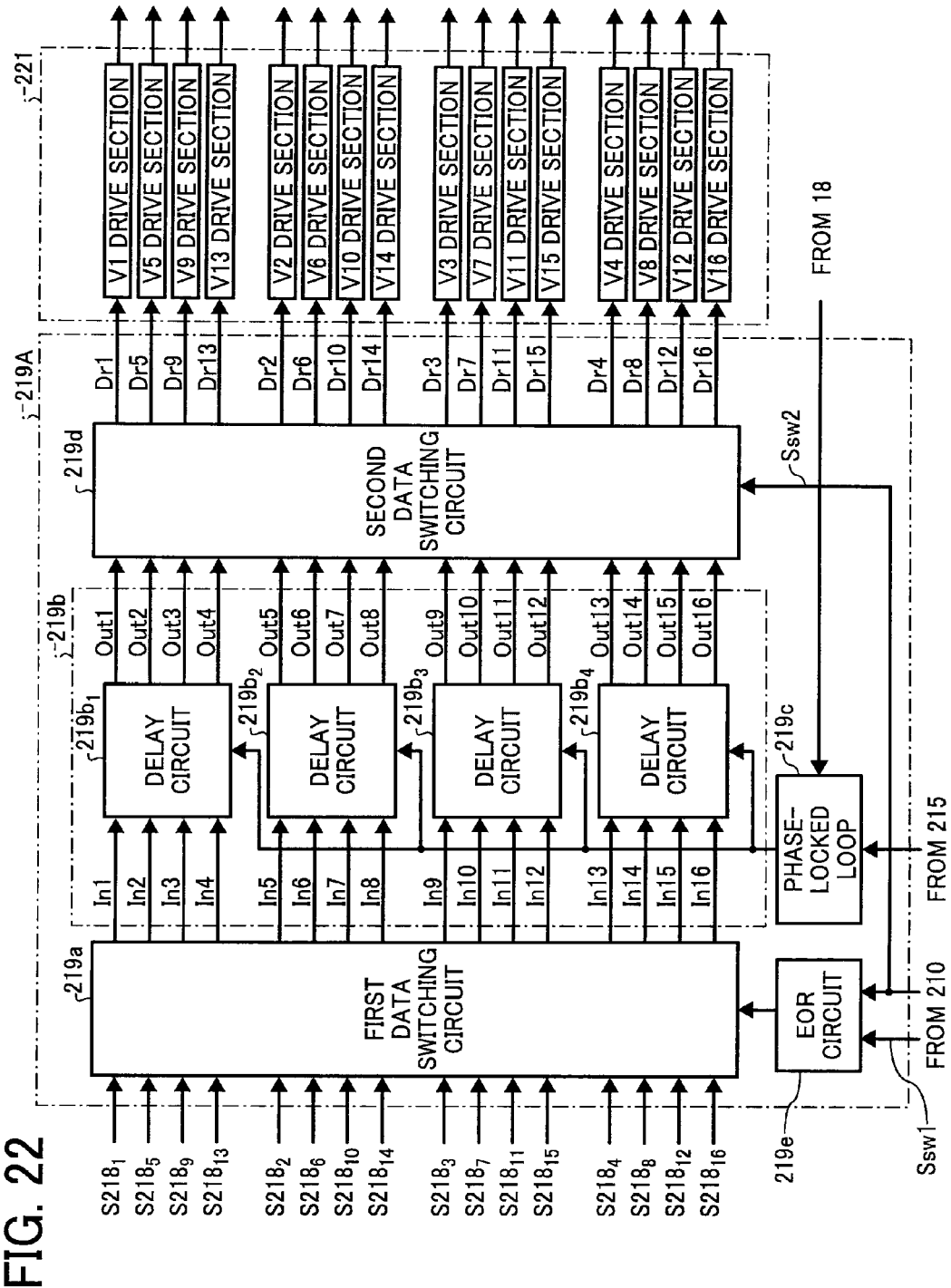
FIG. 22 is a schematic diagram of a write control circuit according to a modification of the present invention.

The write control circuit 219 can be replaced with a write control circuit 219A shown in FIG. 22. The write control circuit 219A is the same as the write control circuit 219 except that an exclusive OR (EOR) circuit 219e is added. As shown in FIG. 23(A), Ssw1="L" when the light spots are arrayed in the arrangement A, and Ssw1="H" when the light spots are arrayed in the arrangement B. As shown in FIG. 23(B), Ssw2="L" when the main scanning direction is −Y direction, and Ssw2="H" when the main scanning direction is +Y direction.

The EOR circuit 219e receives both the Ssw1 and the Ssw2, and outputs a result of XORing the Ssw1 and the Ssw2 to the first data switching circuit 219a (see FIG. 24). The first data switching circuit 219a performs the above-described setting according to the output signal from the EOR circuit 219e.

The operator can set the DIP switch 225 by setting the sw1 according to the current arrangement of the light spots and by setting the sw2 according to the main scanning direction. This improves operability compared with when the DIP switch 225 is set according to an adopted CASE from among CASE-1 to CASE-4.

Figure 25:
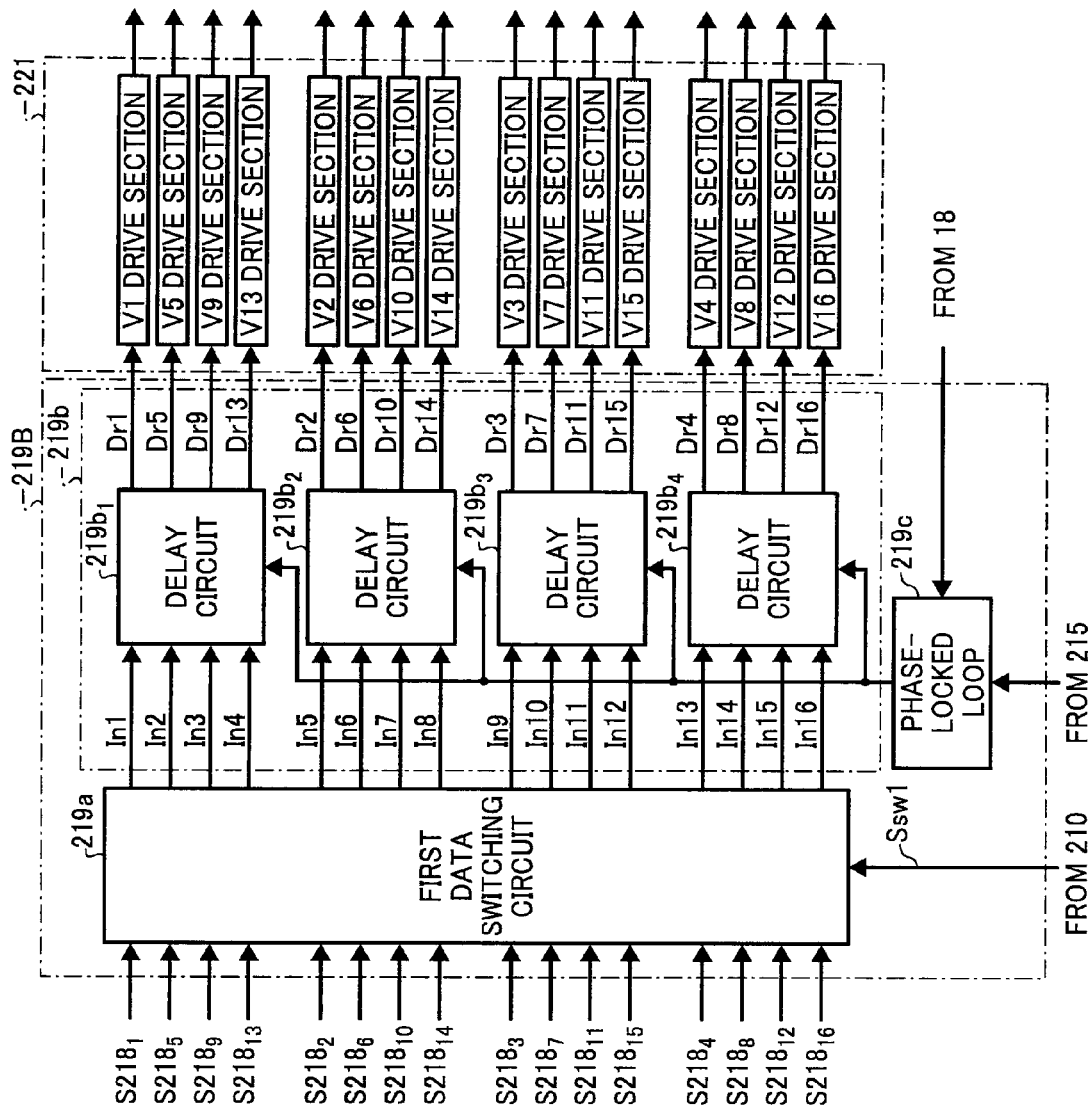
FIG. 25 is a schematic diagram of a write control circuit adoptable only in CASE-1 and CASE-2.

In the above embodiment, as for CASE-1 and CASE-2, a write control circuit 219B shown in FIG. 25 may be used instead of the write control circuit 219. The write control circuit 219B is the same as the write control circuit 219 except that the second data switching circuit 219d is removed.

Figure 26:
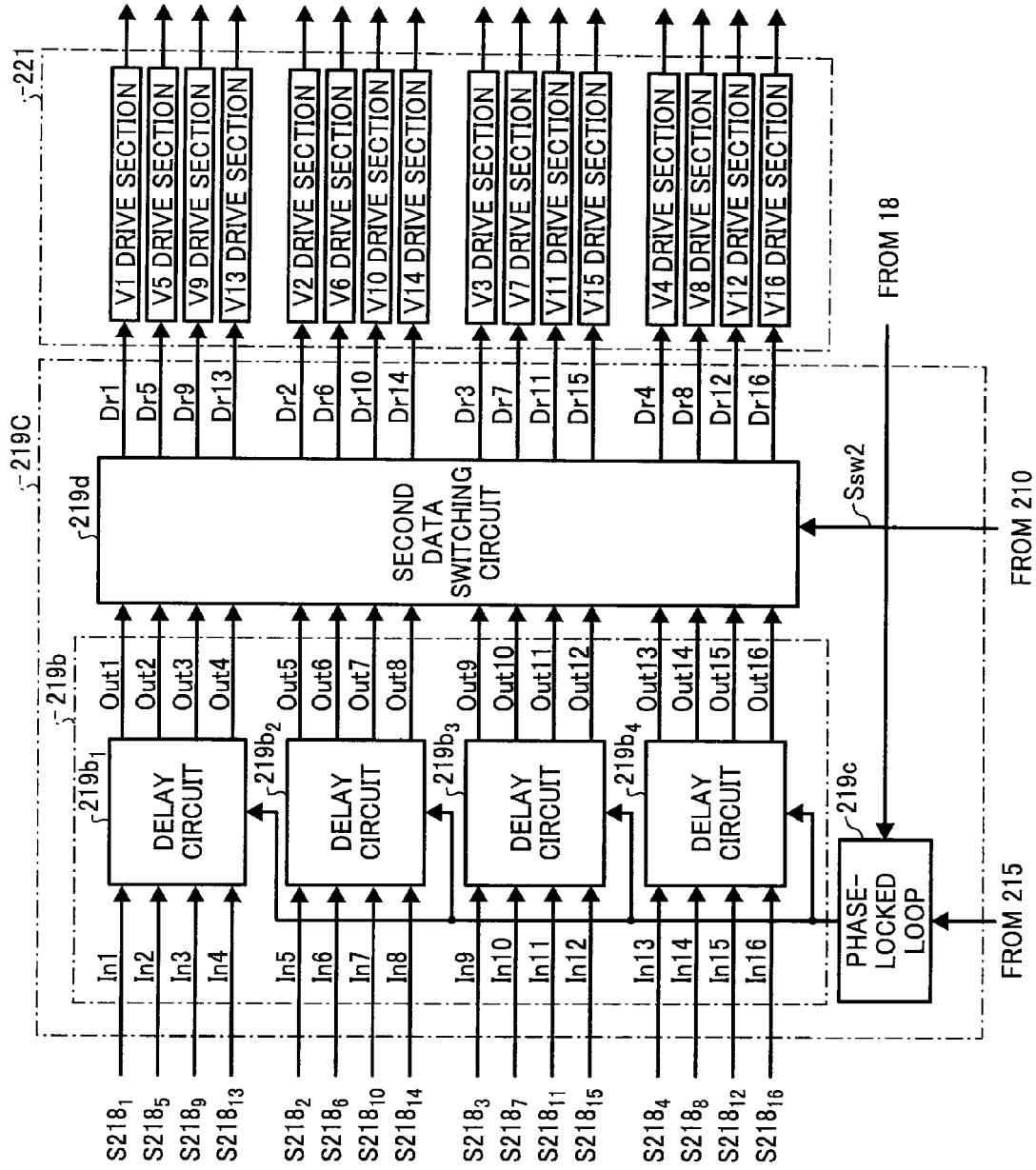
FIG. 26 is a schematic diagram of a write control circuit adoptable only in CASE-1 and CASE-4.

In the above embodiment, as for CASE-1 and CASE-4, a write control circuit 219C shown in FIG. 26 may be used instead of the write control circuit 219. The write control circuit 219C is the same as the write control circuit 219 except that the first data switching circuit 219a is removed.

Although the above embodiment describes the laser printer 1000 as an image forming apparatus, the present invention is not limited to this. Specifically, any image forming apparatus including the optical scanning device 1010 can form a high quality image without cost increase.

For example, an applicable image forming apparatus may directly emit laser light onto a medium (e.g., a paper sheet) that produces color with the laser light.

Alternatively, an image forming apparatus may use a silver film as an image carrier. In this case, a latent image is formed on the silver film by optical scanning, and the latent image can be visualized through a process equivalent to a developing process in normal silver halide printing. Then, the image can be transferred to printing paper in a process equivalent to an exposing process in normal silver halide printing. Such image forming apparatuses can be realized as optical printers, or as optical imaging apparatuses for delineating computed tomographic (CT) scan images or the like.

Figure 27:
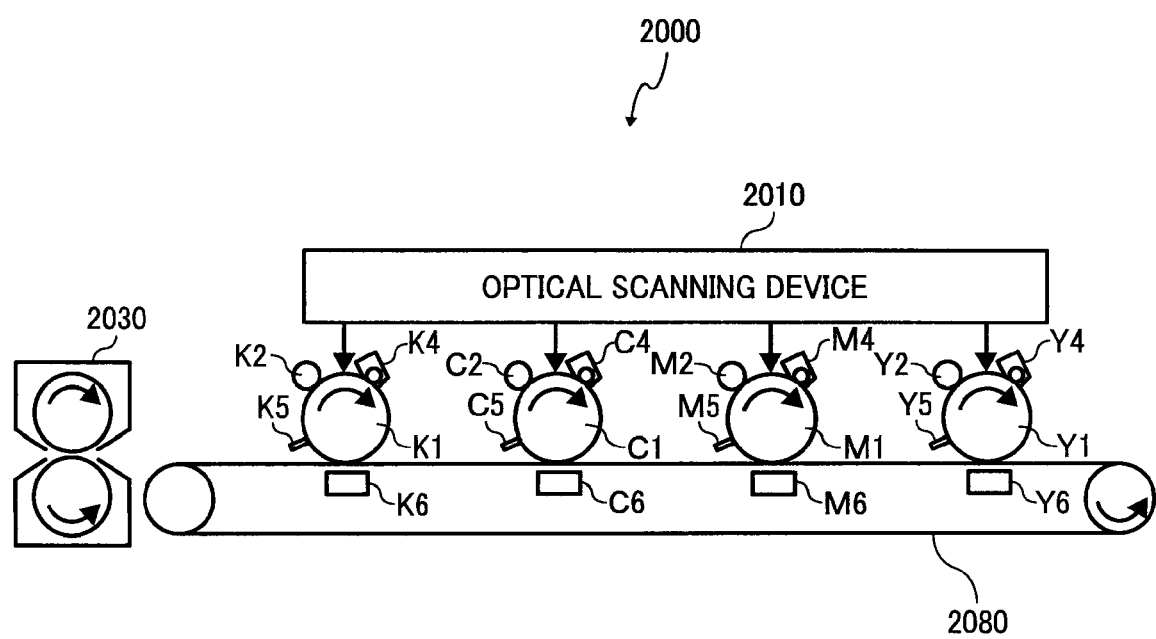
FIG. 27 is a schematic diagram of a color printer according to another embodiment of the present invention.

Further, an image forming apparatus may be a color printer 2000 including a plurality of photosensitive drums, for example, as shown in FIG. 27.

The color printer 2000 is a tandem-type multicolor printer that forms a full color image by stacking four color images (black, cyan, magenta, and yellow). The color printer 2000 includes a photosensitive drum K1, a charger K2, a developing device K4, a cleaning unit K5, and a transfer device K6 for black, a photosensitive drum C1, a charger C2, a developing device C4, a cleaning unit C5, and a transfer device C6 for cyan, a photosensitive drum M1, a charger M2, a developing device M4, a cleaning unit M5, and a transfer device M6 for magenta, and a photosensitive drum Y1, a charger Y2, a developing device Y4, a cleaning unit Y5, and a transfer device Y6 for yellow, and an optical scanning device 2010, a transfer belt 2080, and a fixing unit 2030.

Each of the photosensitive drums rotates in an arrow direction indicated in FIG. 27. Around the photosensitive drum, a charger, a developing device, a transfer device, and a cleaning unit are provided along the rotational direction. Each charger uniformly charges the surface of a corresponding photosensitive drum. The surface of the photosensitive drum, charged by the charger, is irradiated with light from the optical scanning device 2010, so that an electrostatic latent image is formed on the photosensitive drum. In this way, a toner image is formed on the surface of each photosensitive drum by a corresponding developing device. A toner image of a corresponding color is transferred to a recording sheet by a corresponding transfer device, and is eventually fixed to the recording sheet by the fixing unit 2030.

The optical scanning device 2010 includes a light source equivalent to the light source 14, a synchronization detection sensor equivalent to the synchronization detection sensor 18, and a scanning optical system equivalent to the scanning optical system, for each color.

A light beam emitted from each light source is deflected by a common deflector, and is directed to a corresponding photosensitive drum via a corresponding scanning optical system. A portion of such write light beam emitted from each light source and propagated through a corresponding scanning optical system is received at a corresponding synchronization detection sensor.

The optical scanning device 2010 includes a scanning controller. For each color, the optical scanning device drives a plurality of light emitting sections with drive signals appropriate for the main scanning direction and the arrangement of a plurality of light spots, as in the above embodiment. Thus, the optical scanning device achieves the same advantages as the optical scanning device 1010.

The color printer 2000 can form a high quality color image without cost increase.

The color printer 2000 may employ the optical scanning device 1010 for each color, instead of the optical scanning device 2010.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source driving device for use in an optical scanning device, the optical scanning device including a plurality of light emitting sections arranged at different positions with respect to at least a direction corresponding to a plurality of scanning lines and each of which operates based on a drive signal, and a scanning section that performs scanning by moving a plurality of light spots, formed on a surface to be scanned by a plurality of light beams emitted from the light emitting sections and propagated through an optical system, along the scanning lines in a main scanning direction, the light source driving device comprising:
    a write signal generating circuit that generates write signals based on image information, number of the write signals being equal to number of the light emitting sections;
    a drive signal generating circuit that is configured to generate, from the write signals, a first plurality of drive signals and a second plurality of drive signals, and a circuit for causing the drive signal generating circuit to generate one of the first and second plurality of drive signals based on at least one of
        a) a relationship between an arrangement of the light emitting sections and an arrangement of the light spots, and
        b) a relationship between the surface and the main scanning direction; and
    a drive circuit that outputs the drive signals to the light emitting sections in the optical scanning device to drive the light emitting sections.

2. The light source driving device according to claim 1, wherein the drive signal generating circuit includes: signal delay circuits, number of which being equal to number of the write signals; and a control section that sets, based on at least one of a) the relationship between the arrangement of the light emitting sections and the arrangement of the light spots, and b) the relationship between the surface and the main scanning direction, at least one of c) a correspondence relationship between the write signals and the signal delay circuits, and d) a correspondence relationship between signals output from the signal delay circuits and the light emitting sections.

3. The light source driving device according to claim 2, wherein the control section sets the correspondence relationship between the write signals and the signal delay circuits, based on the relationship between the arrangement of the light emitting sections and the arrangement of the light spots.

4. The light source driving device according to claim 2, wherein the control section sets the correspondence relationship between the write signals and the signal delay circuits based on the relationship between the surface and the main scanning direction, and sets the correspondence relationship between the signals output from the signal delay circuits and the light emitting sections on the relationship between the surface and the main scanning direction.

5. The light source driving device according to claim 2, wherein the control section sets the correspondence relationship between the write signals and the signal delay circuits based on the relationship between the arrangement of the light emitting sections and the arrangement of the light spots and the relationship between the surface and the main scanning direction, and sets the correspondence relationship between the signals output from the signal delay circuits and the light emitting sections based on the relationship between the surface and the main scanning direction.

6. An optical scanning device that scans a surface with a plurality of light beams, along a plurality of scanning lines in a main scanning direction, the optical scanning device comprising:
    a light source including a plurality of light emitting sections arranged at different positions corresponding to the scanning lines and each of which operates based on a drive signal;
    a light source driving device that produces the drive signals to drive the light emitting sections in the light source, wherein the light source driving device includes
        a write signal generating circuit that generates write signals based on image information, number of the write signals being equal to number of the light emitting sections;
        a drive signal generating circuit that is configured to generate, from the write signals, a first plurality of drive signals and a second plurality of drive signals, and a circuit for causing the drive signal generating circuit to generate one of the first and second plurality of drive signals based on at least one of a) a relationship between an arrangement of the light emitting sections and an arrangement of the light spots, and b) a relationship between the surface and the main scanning direction; and
        a drive circuit that outputs the drive signals to the light emitting sections in the optical scanning device to drive the light emitting sections; and
    an optical system that enables the light beams emitted from the light source to be converged on the surface, and that moves a plurality of light spots on the surface, along the scanning lines in the main scanning direction.

7. The optical scanning device according to claim 6, wherein the light source is a surface-emitting laser array.

8. An image forming apparatus comprising:
   at least one image carrier; and
   at least one optical scanning device that scans a surface of the image carrier with a plurality of light beams, along a plurality of scanning lines in a main scanning direction, wherein the optical scanning device includes
      a light source including a plurality of light emitting sections arranged at different positions corresponding to the scanning lines and each of which operates based on a drive signal;
      a light source driving device that produces the drive signals to drive the light emitting sections in the light source, wherein the light source driving device includes
         a write signal generating circuit that generates write signals based on image information, number of the write signals being equal to number of the light emitting sections;
         a drive signal generating circuit that is configured to generate, from the write signals, a first plurality of drive signals and a second plurality of drive signals, and a circuit for causing the drive signal generating circuit to generate one of the first and second plurality of drive signals based on at least one of a) a relationship between an arrangement of the light emitting sections and an arrangement of the light spots, and b) a relationship between the surface and the main scanning direction; and
         a drive circuit that outputs the drive signals to the light emitting sections in the optical scanning device to drive the light emitting sections; and
      an optical system that enables the light beams emitted from the light source to be converged on the surface, and that moves a plurality of light spots on the surface, along the scanning lines in the main scanning direction.

9. The image forming apparatus according to claim 8, wherein the image carrier is provided in plurality and each of the image carriers corresponds to a specific color.

* * * * *